(12) United States Patent
Kilawee et al.

(10) Patent No.: US 7,569,150 B2
(45) Date of Patent: Aug. 4, 2009

(54) DUAL GENERATOR SINGLE POWER SOURCE FOR TANDEM POOL AND SPA

(75) Inventors: Patrick H. Kilawee, Hugo, MN (US); Clyde A. Bailey, Hastings, MN (US); Leonard J. Kadlec, Woodbury, MN (US)

(73) Assignee: Ecolab Inc., Eagan, MN (US)

( * ) Notice: Subject to any disclaimer, the term of this patent is extended or adjusted under 35 U.S.C. 154(b) by 311 days.

(21) Appl. No.: 11/157,073

(22) Filed: Jun. 20, 2005

(65) Prior Publication Data

US 2006/0283809 A1 Dec. 21, 2006

(51) Int. Cl.
*E04H 4/12* (2006.01)

(52) U.S. Cl. .................. 210/741; 210/167.11; 210/739; 210/746

(58) Field of Classification Search .................. 210/739, 210/741, 746, 754, 167.11, 748; 204/228.6; 205/743; E04H 4/12
See application file for complete search history.

(56) References Cited

U.S. PATENT DOCUMENTS

| | | | |
|---|---|---|---|
| 4,492,618 A * | 1/1985 | Eder | ........................... 205/701 |
| 5,037,519 A | 8/1991 | Wiscombe | |
| 5,849,199 A * | 12/1998 | Jack | ........................... 210/741 |
| 5,985,155 A * | 11/1999 | Maitland | ..................... 210/739 |
| 6,425,999 B1 * | 7/2002 | Huang | ................... 210/167.11 |
| 6,508,929 B1 | 1/2003 | Mercer | |
| 6,821,398 B2 | 11/2004 | Von Broembsen | |
| 6,827,847 B1 * | 12/2004 | Chauvier | ..................... 210/138 |

FOREIGN PATENT DOCUMENTS

WO   WO 2004/108613 A1   12/2004

* cited by examiner

*Primary Examiner*—Walter D Griffin
*Assistant Examiner*—Cameron Allen
(74) *Attorney, Agent, or Firm*—Faegre & Benson LLP

(57) ABSTRACT

A sanitizer generation system supplies power to a first and a second sanitizer generator. Each of the sanitizer generators is connected to a body of water by a circulation system. The system includes a power supply and a control system connected to the power supply and the sanitizer generators. The control system selectively delivers electric current from the power supply to the first and second sanitizer generators.

12 Claims, 1 Drawing Sheet

DUAL GENERATOR SINGLE POWER SOURCE FOR TANDEM POOL AND SPA

CROSS-REFERENCE TO RELATED APPLICATION(S)

The present application is related to the concurrently filed applications Ser. No. 11/157,020, "Automated Electrolyte Addition for Salt Water Pools, Spas, and Water Features" and Ser. No. 11/157,041, "Pool and Spa Dual Body Sanitization."

BACKGROUND OF THE INVENTION

The present invention relates to systems and methods for sanitizing pools and spas. In particular, the present invention relates to a single power source system for generating a sanitizer for a tandem swimming pool and spa.

Pools and spas have a circulation system that continually pumps water from the pool or spa through a filter, heater, and sanitizer feed system before returning the water back to the pool or spa. The circulation system is necessary to maintain the body of water at sanitary conditions. The water passes through the filter to reduce the accumulation of foreign material, such as hair, soil, or solids, in the pool or spa. Once the water has been filtered, the water passes through the heater, where the water is heated prior to returning to the pool or spa.

In addition to filtering, pool and spa water also requires regular sanitization in order to maintain hygienic conditions. Allowing sanitation levels to either fall below or rise above required specifications results in decreased efficiency of the system. Low levels of chemical sanitizer in the pool or spa can contribute to algae blooms, bacterial breakouts, cloudiness in the water, and chemical imbalances. A method for sanitizing pool or spa water is by adding sodium chloride (NaCl) to the pool or spa and passing the water containing sodium chloride through a chlorine generator where electrolysis converts the sodium chloride and water to sodium hypochlorite (NaOCl), by the following reaction:

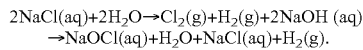

$$2NaCl(aq) + 2H_2O \rightarrow Cl_2(g) + H_2(g) + 2NaOH\ (aq)$$
$$\rightarrow NaOCl(aq) + H_2O + NaCl(aq) + H_2(g).$$

The chlorine generator is capable of being powered on and off depending on the concentration of chlorine in the water. When there is a sufficient level of chlorine in the pool or spa water, the chlorine generator is powered off and no reaction takes place. Thus, water circulating through the circulation system is filtered and heated, but the composition of the water is not altered. When the level of chlorine has fallen to a desired setpoint, the chlorine generator is powered on and the sodium chloride and water passing through the chlorine generator is converted to sodium hypochlorite. The chlorine generator remains powered on until the concentration of chlorine in the water has reached a desired steady state level.

Oftentimes, both a swimming pool and a spa are installed. Typically, the volume of the pool is on average ten to fifteen times larger than the volume of the spa. Despite this large difference in volumes, the cost of the equipment for treating the pool and spa is not significantly different. The need for two power sources, one supplying power to generate chlorine for the pool and the other supplying power to generate chlorine for the spa, can result in higher installation and maintenance costs for the tandem pool and spa.

BRIEF SUMMARY OF THE INVENTION

A sanitizer generation system supplies power from a single source to a first and a second sanitizer generator. Each of the sanitizer generators is connected to a body of water by a circulation system. The system includes a power supply and a control system connected to the power supply and the sanitizer generators. The control system selectively delivers electric current from the power supply to the first and second sanitizer generators.

DETAILED DESCRIPTION

Figure 1:
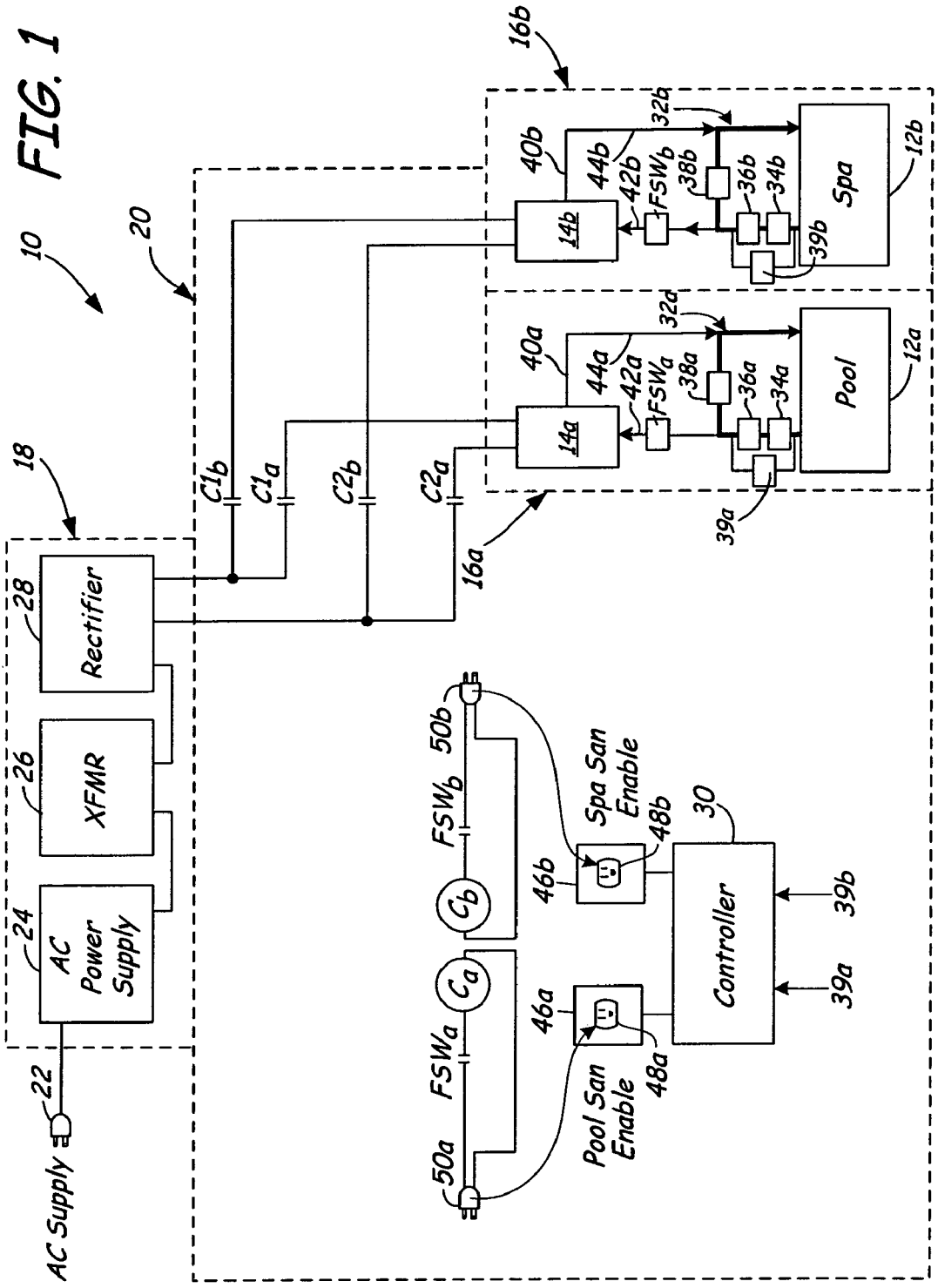
FIG. 1 is a schematic diagram of a dual generator single power source system in accordance with the present invention.

FIG. 1 is a schematic diagram of sanitizer generation system 10 in accordance with the present invention. Sanitizer generation system 10 is a dual sanitizing generator, single power source system that maintains the sanitizer concentration in two bodies of water, such as pool 12a and spa 12b, at a desired level by generating sanitizer for both bodies of water with a single power source. Pool 12a and spa 12b may be any combination of bodies of water to be treated. Using a single power source to generate sanitizer for two bodies of water that are in close proximity to one another is beneficial for reducing the cost of maintaining such systems by as much as 42%.

Sanitizer generation system 10 is connected to pool sanitizer generator 14a and to spa sanitizer generator 14b by pool circulation system 16a and spa circulation system 16b, respectively, and generally includes power supply system 18 and control system 20. Power supply system 18 supplies electric current to sanitizer generation system 10 from an alternating current (AC) supply 22 and includes power supply box 24, transformer box 26, and rectifier box 28. Control system 20 includes pool flow switch $FSW_a$, spa flow switch $FSW_b$, pool relay coil $C_a$ and contacts $C1_a$ and $C2_a$, spa relay coil $C_b$ and contacts $C1_b$ and $C2_b$, and controller 30.

Sanitizer generation system 10 maintains the concentration of sanitizer in pool 12a and spa 12b at a desired level by powering sanitizer generators 14a and 14b on and off as needed. When the level of sanitizer concentration in pool 12a falls to a desired setpoint, pool sanitizer generator 14a is powered on to generate sanitizer for pool 12a. Likewise, spa sanitizer generator 14b is powered on when the level of sanitizer concentration in spa 12b reaches a minimum level in order to generate more sanitizer for spa 12b.

Pool circulation system 16a runs continuously and includes piping 32a, circulation pump 34a, filter 36a, heater 38a, sensor 39a, side stream 40a, flow switch $FSW_a$, and sanitizer generator 14a. Circulation system 16a connects pool 12a to sanitizer generator 14a and operates independently of pool and spa sanitizer generators 14a and 14b. When there is a sufficient level of sanitizer in pool 12a, sanitizer generator 14a is powered off and water flows through sanitizer generator 14a without being reacted. When sanitizer is needed, sanitizer generator 14a is powered on while circulation system 16a transports water from pool 12a through sanitizer generator 14a and transports sanitized water back to pool 12a. Circulation pump 34a is typically positioned immediately downstream from pool 12a and pumps water from pool 12a through piping 32a and side stream 40a.

Side stream 40a of circulation system 16a includes sanitization inlet line 42a and sanitization outlet line 44a. Water enters sanitizer generator 14a through sanitization inlet line 42a and leaves sanitizer generator 14a through sanitization outlet line 44a. Sanitization inlet line 42a is plumbed to piping 32a between filter 36a and heater 38a and connects pool 12a to sanitizer generator 14a. When sanitization inlet line 42a branches from piping 32a, some of the water flowing through piping 32a is diverted into sanitization inlet line 42a at a flow rate lower than the flow rate of the water flowing through piping 32a.

Because a pump is not plumbed to side stream 40a, a pressure drop is required across circulation system 16a to maintain the flow of water in side stream 40a at a velocity sufficient to pass the water through sanitizer generator 14a and back to pool 12a. To create a pressure drop across circulation system 16a, sanitization inlet line 42a is plumbed to piping 32a immediately after filter 36a. Positioning sanitization inlet line 42a downstream from filter 36a and upstream from sanitizer generator 14a also ensures that only a minimal amount of foreign material present in the water enters sanitizer generator 14a. Without filter 36a, foreign material could accumulate inside sanitizer generator 14a and reduce the life and performance of sanitizer generator 14a.

Alternatively, sanitization inlet line 42a may also be plumbed to piping 32a immediately after circulation pump 34a. However, although positioning sanitization inlet line 42a between circulation pump 34a and filter 36a would provide an adequate pressure drop across circulation system 16a, the water entering sanitizer generator 14a would be unfiltered. Thus, installation of an in-line strainer with a small mesh in sanitization inlet line 42a would be necessary to reduce build-up of foreign material in sanitizer generator 14a.

Pool flow switch $FSW_a$ is plumbed to circulation system 16a at sanitization inlet line 42a and senses water flow from piping 32a through sanitization inlet line 42a. Flow switch $FSW_a$ serves as a failsafe for sanitizer generation system 10. Sanitizer generator 14a is only capable of being powered on if flow switch $FSW_a$ senses water flow through pool sanitization inlet line 42a. If flow switch $FSW_a$ does not sense water flow through sanitization inlet line 42a, flow switch $FSW_a$ will not close and power is not supplied to sanitizer generator 14a.

The water leaves sanitizer generator 14a at sanitization outlet line 44a, which connects to piping 32a downstream from heater 38a so that the water from sanitization outlet line 44a and the water from pool piping 32a combine prior to entering pool 12a.

Spa circulation system 16b includes piping 32b, circulation pump 34b, filter 36b, heater 38b, sensor 39b, side stream 40b, and flow switch $FSW_b$ and functions in the same manner as pool circulation system 16a.

Sanitizer generators 14a and 14b are electrolytic cells that produce sanitizer from the water and electrolyte pumped through side streams 40a and 40b when sanitizer generators 14a and 14b are powered on, respectively. The water from pool 12a and spa 12b circulating through circulation systems 16a and 16b typically contain electrolyte that has been added to pool 12a and spa 12b. When there is a sufficient level of sanitizer in pool 12a and spa 12b, sanitizer generators 14a and 14b are powered off and the water and electrolyte pass through without being reacted. In one embodiment, sanitizer generators 14a and 14b are watertight tubes containing titanium plates coated with a precious metal. Although sanitizer generators 14a and 14b are shown in FIG. 1 as being plumbed in parallel with heaters 38a and 38b, sanitizer generators 14a and 14b may also be plumbed in-line with heaters 38a and 38b without departing from the intended scope of the present invention.

In an exemplary embodiment, pool and spa sensors 39a and 39b are connected to pool and spa circulation systems 16a and 16b, respectively, and measure the oxidation-reduction potential (sanitizer concentration) of the water passing through circulation systems 16a and 16b. Sanitizer generation system 10 is at steady state and sanitizer generators 14a and 14b are powered off when the sensed parameter (e.g. oxidation-reduction potential, pH, or conductivity) of the water in circulation systems 16a and 16b is at a desired level. When the sensed parameter of the water in pool 12a reaches a desired setpoint, sensor 39a communicates to controller 30 that pool 12a needs sanitization. Likewise, when the sensed parameter of the water in spa 12b reaches a desired setpoint, sensor 39b communicates to controller 30 that spa 12b needs sanitization.

Controller 30 is in communication with sensors 39a and 39b and is connected to power supply source 18 and relay coils $C_a$ and $C_b$ through pool sanitization enable 46a and spa sanitization enable 46b. Pool sanitization enable 46a enables plug 50a. Spa sanitization enable 46b enables plug 50b. In one embodiment, controller 30 is an Acu-Trol AK2100D controller with the capability to monitor oxidation-reduction potential.

Pool sanitizer generator 14a can only be activated if two conditions are met: (1) sensor 39a communicates to controller 30 that sanitizer is needed in pool 12a, and (2) flow switch $FSW_a$ senses that there is water flow through pool sanitization inlet line 42a. If both conditions are met, controller 30 supplies electric current to pool enable plug 50a. Current is supplied to pool enable plug 50a through power enable outlet 46a. AC supply box 22 provides an alternating current to power supply system 18. Power supply box 24 houses a primary transformer, current driver, and main relay switch. Transformer box 26 converts the alternating current to the voltage required to run sanitizer generators 14a and 14b. Rectifier box 28 converts the alternating current to a direct current and houses a rectifier set, cooling block, and mechanical relay set.

Current is supplied to pool enable plug 50a via outlet 46a to energize pool relay coil $C_a$. When energized, pool relay coil $C_a$ closes pool relay contacts $C1_a$ and $C2_a$, allowing electric current from power supply system 18 to reach pool sanitizer generator 14a. Once pool sanitizer generator 14a is powered on, the water and electrolyte entering pool sanitizer generator 14a through pool sanitization inlet line 42a is reacted and converted to a sanitizer solution.

In addition to controller 30 enabling pool sanitization enable plug 50a, flow switch $FSW_a$ must also sense water flow through pool sanitization inlet line 42a for pool sanitizer generator 14a to power on. When flow switch $FSW_a$ senses water flow through pool sanitization inlet line 42a, flow switch $FSW_a$ closes and electric current passes through relay coil $C_a$. If flow switch $FSW_a$ does not sense water flow through pool sanitization inlet line 42a, flow switch $FSW_a$ remains open and sanitizer generator 14a cannot be powered on even though pool enable plug 50a is enabled. If electric current cannot reach transformer box 26 or relay coil $C_a$, sanitizer generator 14a cannot be activated.

Pool sensor 39a continuously communicates the amount of sanitizer in the water in pool circulation system 16a to controller 30. As sanitizer is added to the water in pool circulation system 16a, the sanitizer level of the water increases. Once the sanitizer level of the water reaches a desired maximum level, there is a sufficient amount of sanitizer in pool 12a and controller 30 cuts off electric current to pool sanitization enable plug 50a. When pool sanitization enable plug 50a is not enabled, pool relay coil $C_a$ is de-energized, causing pool relay contacts $C1_a$ and $C2_a$ to open and cut off power to pool sanitizer generator 14a.

Spa circulation system 16b, spa flow switch $FSW_b$, spa sensor 39b, spa relay coil $C_b$, spa relay contacts $C1_b$ and $C2_b$, and spa sanitizer generator 14b function and interact with controller 30 in the same manner as pool circulation system 16a, pool flow switch $FSW_a$, pool sensor 39a, pool relay coil $C_a$, pool relay contacts $C1_a$ and $C2_a$, and pool sanitizer generator 14a.

Sanitizer generation system 10 has the capability to supply power to sanitizer generators 14a and 14b simultaneously, or one at a time, depending on the needs of pool 12a and spa 12b. When only one of sanitizer generators 14a and 14b is activated, full power is sent to the activated generator from power supply system 18. When sanitizer generators 14a and 14b are activated simultaneously, the power sent to each generator 14a and 14b is split. Thus, the output of each generator 14a and 14b is also reduced. Although FIG. 1 depicts sanitizer generators 14a and 14b as being equal in size, sanitizer generators 14a and 14b may also be sized depending on the desired output. Because pool 12a is typically much larger than spa 12b, pool 12a generally requires more sanitizer than spa 12b. Thus, it may be more effective for pool sanitizer generator 14a to be larger than spa sanitizer generator 14b. In addition, although FIG. 1 discusses a single power source sanitizer generation system supplying power to two bodies of water, the sanitizer generation system can supply power to more than two bodies of water without departing from the intended scope of the present invention.

Although the present invention is discussed using an automated system to activate and deactivate pool and spa sanitizer generators 14a and 14b, sanitizer generation system 10 can also be run manually, without a controller. Power is supplied to sanitizer generation system 10 at a level such that both pool and spa sanitizer generators 14a and 14b run continuously. While power is continuously supplied to sanitizer generation system 10, it is supplied at a trickle in order to avoid over-chlorination of either pool 12a or spa 12b.

The sanitizer generation system of the present invention provides a single power source for activating more than one sanitizer generator in order to reduce the cost of maintaining the sanitizer concentration of multiple bodies of water at a desired level. The sanitizer generation system is capable of supplying power to either only one sanitizer generator at a time, or to more than one sanitizer generator at a time. When a sensor in a circulation system circulating water from a body of water communicates to a controller that the sanitizer concentration in the body of water needs to be increased, the controller enables a pool sanitization enable plug to supply electric current through a power supply to the sanitizer generator connected to the body of water. The electric current provides the power necessary to run the sanitizer generator.

In addition to a need for sanitizer, a flow switch in the circulation system must also sense water flow through the circulation system in order for the sanitizer generator to be powered on. If the flow switch senses water flow in the circulation system, electric current passes through the power supply and energizes a relay coil. When the relay coil is energized, it closes a pair of relay contacts and allows electric current flowing from the power supply to reach the sanitizer generator. Once the sanitizer concentration in the body of water has reached a desired maximum level, the controller cuts off electric current to the enable plug, which de-energizes the relay coil, causing the relay contacts to open. When the relay contacts are open, no power is supplied to the sanitizer generator. If at any time the flow switch does not sense water flow through the circulation system, the flow switch is opened and electric current cannot reach the sanitizer generator.

Although the present invention has been described with reference to preferred embodiments, workers skilled in the art will recognize that changes may be made in form and detail without departing from the spirit and scope of the invention.

The invention claimed is:

1. A system comprising:
   (a) a first sanitizer generator connected to a first body of water by a first circulation system;
   (b) a second sanitizer generator connected to a second body of water by a second circulation system;
   (c) a shared power supply for providing electric current to the first sanitizer generator and the second sanitizer generator; and
   (d) a shared control system connected to the power supply, the first sanitizer generator and the second sanitizer generator for selectively delivering electric current from the shared power supply to the first and second sanitizer generators.

2. The system of claim 1, and further comprising a first sensor located in the first circulation system, wherein the first sensor senses a parameter related to a sanitizer level in the water of the first body of water.

3. The system of claim 2, and further comprising a second sensor located in the second circulation system, wherein the second sensor senses a parameter related to a sanitizer level in the water of the second body of water.

4. The system of claim 3, wherein the control system selectively delivers electric current to the first sanitizer generator based upon a signal from the first sensor.

5. The system of claim 4, wherein the control system selectively delivers electric current to the second sanitizer generator based upon a signal from the second sensor.

6. The system of claim 5, wherein the control system comprises:
   (a) a first flow sensor for sensing water flow through the first sanitizer generator;
   (b) a second flow sensor for sensing water flow through the second sanitizer generator; and
   (c) a control circuit connected to the shared power supply, wherein the control circuit controls delivery of electric current to the first sanitizer generator based on whether water flow is sensed by the first flow sensor, and wherein the control circuit controls delivery of electric current to the second sanitizer generator based on whether water flow is sensed by the second flow sensor.

7. The system of claim 1, wherein the control system comprises:
   (a) a first relay for controlling flow of current between the shared power supply and the first sanitizer generator based on need for sanitizer in the first body of water and water flow in the first sanitizer generator; and
   (b) a second relay for controlling flow of current between the shared power supply and the second sanitizer generator based on need for sanitizer in the second body of water and water flow in the second sanitizer generator.

8. A sanitizer generation system for treating water from a plurality of bodies of water, the system comprising:
   (a) a plurality of sanitizer generators, each sanitizer generator connected to receive water from one of the bodies of water, wherein each sanitizer generator receives water from a different one of the bodies of water;
   (b) a shared power supply; and
   (c) a shared control system connected to the shared power supply and the plurality of sanitizer generators for selectively delivering electric current from the shared power supply to the plurality of sanitizer generators.

9. The system of claim 8, and further comprising a plurality of sensors, wherein each sensor senses a parameter related to a need for sanitization of water in one of the bodies of water.

10. The system of claim 9, wherein the control system selectively delivers electric current to the plurality of sanitizer generators based upon signals from the sensors.

11. The system of claim 9, wherein the control system comprises:
(a) a plurality of flow sensors, wherein each flow sensor senses water flow through one of the sanitizer generators; and
(b) a control circuit connected to the power supply, wherein the control circuit delivers electric current to each sanitizer generator based on the need for sanitization of the body of water connected to that sanitizer generator and water flow sensed in that sanitizer generator.

12. The system of claim 11, wherein the control circuit includes:
(a) a plurality of relays, wherein each relay controls flow of current between the power supply and one of the sanitizer generators.

* * * * *